US012523749B2

(12) United States Patent
Haag et al.

(10) Patent No.: US 12,523,749 B2
(45) Date of Patent: Jan. 13, 2026

(54) OPERATING METHOD AND CONTROL UNIT FOR A LIDAR SYSTEM, LIDAR SYSTEM, AND DEVICE

(71) Applicant: Robert Bosch GmbH, Stuttgart (DE)

(72) Inventors: Norman Haag, Stuttgart (DE); Stefan Spiessberger, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 951 days.

(21) Appl. No.: 17/767,511

(22) PCT Filed: Nov. 4, 2020

(86) PCT No.: PCT/EP2020/080931
§ 371 (c)(1),
(2) Date: Apr. 8, 2022

(87) PCT Pub. No.: WO2021/089604
PCT Pub. Date: May 14, 2021

(65) Prior Publication Data
US 2024/0094348 A1    Mar. 21, 2024

(30) Foreign Application Priority Data

Nov. 7, 2019  (DE) ..................... 10 2019 217 162.1

(51) Int. Cl.
*G01S 7/481*     (2006.01)
*G01S 17/89*     (2020.01)

(52) U.S. Cl.
CPC ............ *G01S 7/4816* (2013.01); *G01S 17/89* (2013.01)

(58) Field of Classification Search
CPC .... G01S 7/4814; G01S 7/4816; G01S 7/4817; G01S 7/89
See application file for complete search history.

(56) References Cited

U.S. PATENT DOCUMENTS 8,199,244 B2 * 6/2012 Baraniuk .................. H04N 3/08
348/335
2011/0260036 A1  10/2011 Baraniuk et al.
(Continued)

FOREIGN PATENT DOCUMENTS

CH              697048 A5      3/2008
CN           103875138 A       6/2014
(Continued)

OTHER PUBLICATIONS

International Search Report for PCT/EP2020/080931, Issued Jan. 21, 2021.

(Continued)

*Primary Examiner* — Isam A Alsomiri
*Assistant Examiner* — Joseph C Fritchman
(74) *Attorney, Agent, or Firm* — Norton Rose Fulbright US LLP

(57) ABSTRACT

An operating method for a LiDAR system, in particular of the compressed sensing type. On the emission side, primary light is emitted in an unstructured manner into a visual field for the illumination thereof, and on the receiving side, light from the visual field is received as secondary light, is converted by light structuring using a predefined, fixed, and temporally constant, matrix-like pattern, into restructured secondary light having at least one matrix-like light pattern (Continued)

consisting of columnar patterns, and for detection, is respectively imaged column by column using the columnar patterns on an associated common detector element of a detector arrangement and detected as a whole.

15 Claims, 4 Drawing Sheets

(56) References Cited

U.S. PATENT DOCUMENTS

| | | | |
|---|---|---|---|
| 2012/0069342 A1* | 3/2012 | Dalgleish | G01N 21/47 356/445 |
| 2013/0088726 A1* | 4/2013 | Goyal | G01S 17/10 356/634 |
| 2016/0033642 A1 | 2/2016 | Fluckiger | |
| 2016/0146595 A1 | 5/2016 | Boufounos et al. | |
| 2017/0276545 A1* | 9/2017 | Henriksson | H04N 13/204 |
| 2017/0357000 A1* | 12/2017 | Bartlett | G01S 7/4814 |

FOREIGN PATENT DOCUMENTS

| | | |
|---|---|---|
| CN | 105223582 A | 1/2016 |
| CN | 105242281 A | 1/2016 |
| CN | 108152830 A | 6/2018 |
| CN | 108693515 A | 10/2018 |
| CN | 109477897 A | 3/2019 |
| CN | 109901191 A | 6/2019 |
| CN | 110140060 A | 8/2019 |
| DE | 102018203584 A1 | 9/2019 |
| DE | 102018205984 A1 | 10/2019 |
| DE | 102018219476 A1 | 5/2020 |

OTHER PUBLICATIONS

Howland et al., "Photon-Counting Compressive Sensing Laser Radar for 3D Imaging," Applied Optics vol. 50, No. 31, 2011, pp. 5917-5920. <https://www.academia.edu/2872923/Photon_counting_compressive_sensing_laser_radar_for_3D_imaging?auto=download> Downloaded Apr. 7, 2022.

Howland et al., "Photon Counting Compressive Depth Mapping," Optical Society of America, 2013, pp. 1-16. <https://arxiv.org/pdf/1309.4385.pdf> Downloaded Apr. 7, 2022.

Edgar et al., "Real-Time Computational Photon-Counting Lidar," Optical Engineering, vol. 57, No. 3, 2018, pp. 1-8. <http://eprints.gla.ac.uk/154304/1/154304.pdf> Downloaded Apr. 7, 2022.

Colaco A et al., "Compressive Depth Map Acquisition Using a Single Photon-Counting Detector: Parametric Signal Processing Meets Sparsity," Computer Vision and Pattern Recognition (CVPR), 2012 IEEE Conference on, IEEE, 2012, pp. 96-102. <https://citeseerx.ist.psu.edu/viewdoc/download?doi=10.1.1.379.5397&rep=rep1&type=pdf> Downloaded Apr. 7, 2022.

\* cited by examiner

OPERATING METHOD AND CONTROL UNIT FOR A LIDAR SYSTEM, LIDAR SYSTEM, AND DEVICE

FIELD

The present invention relates to an operating method and a control unit for a LiDAR system, a LiDAR system, and a working device which is configured as comprising a LiDAR system and in particular as a vehicle.

BACKGROUND INFORMATION

LiDAR (light detection and ranging) systems are increasingly being used for environment recognition of working devices and in particular of vehicles, wherein they are configured to emit light or infrared radiation into a visual field and to capture and evaluate radiation reflected from the visual field in order to analyze the visual field and to detect objects contained therein. In order to improve LiDAR systems and methods, namely to decrease the required power of the light sources, increase eye safety, and to obtain as far as possible dynamically selectable resolution along with a reduced quantity of data and simplified detection, the concepts of line flash LiDAR and compressed sensing LiDAR have been combined with one another and with light structuring of the primary light emitted into a visual field.

SUMMARY

The operating method according to the present invention for a LiDAR system, in particular of the compressed sensing type, may have the advantage that due to the use of a fixedly predefined configuration for light structuring, it is possible to dispense with complexly actuated light modulation using a correspondingly complex light modulator. According to an example embodiment of the present invention, this is achieved by creating an operating method for a LiDAR system, in particular of the compressed sensing type, wherein
  (i) On the emission side, primary light is emitted in an unstructured manner into a visual field for the illumination thereof, and
  (ii) On the receiving side, light from the visual field
    (ii-1) Is received as secondary light,
    (ii-2) Is converted by light structuring using a predefined, fixed, and temporally constant matrix-like pattern into restructured secondary light having at least one matrix-like light pattern consisting of columnar patterns, and
    (ii-3) For detection, is respectively imaged column by column using the columnar patterns on an associated common detector element of a detector arrangement, and detected as a whole.

According to the present invention, using these measures it is possible to dispense with a conventionally provided and complexly actuated light modulation using a correspondingly complex light modulator.

Preferred developments of the present invention are disclosed herein.

In an advantageous example embodiment of the operating method according to the present invention, the underlying matrix-like pattern is provided by way of a pattern generator and in particular by way of a predefined, fixed, and temporally constant light mask.

The detection and the evaluation of the secondary light may take place in various ways.

In a specific embodiment of the operating method according to the present invention, the received secondary light may be restructured in transmission and/or in reflection into the underlying matrix-like pattern and in particular into the secondary light to be restructured which is providing the pattern.

In particular, in this process, it is possible that the transmitted restructured secondary light—which is configured using a first transmitted matrix-like light pattern having first columnar patterns—is detected by a first detector arrangement having first detector elements.

Additionally or alternatively, it is possible that reflected restructured secondary light—which is configured using a second reflected matrix-like light pattern having second columnar patterns—is detected by a second detector arrangement having second detector elements.

Furthermore, additionally or alternatively, the reflected and transmitted light patterns may after detection be evaluated and analyzed separately and/or in combination with each other as light patterns which are complementary to one another.

Various approaches also lend themselves for the illumination of the visual field by the primary light.

In a specific embodiment of the operating method according to the present invention, the illumination of the visual field by primary light takes place through linear illumination using an essentially line-like light field or linear light field of the primary light, in particular by sampling while swiveling the light field over the visual field.

The swiveling action may be performed by swiveling a light source and/or using deflecting optics.

Alternatively or additionally, illumination of the visual field by primary light may take place using planar illumination by an essentially plane-like light field or planar light field.

In the case of each of the principles, illumination is possible continuously and/or according to the flash principle.

According to another development of the operating method according to the present invention, it is especially advantageous if during illumination of the visual field, on the receiving side, for obtaining an association between columnar patterns of the underlying pattern and corresponding imaged columnar patterns on detector elements of a respective detector arrangement, an underlying pattern generator, a respective detector arrangement, and/or underlying primary optics are swiveled in a coordinated, controlled and/or regulated manner. Thus it is possible, in a controlled manner, to image each original image point in the visual field in connection with a plurality of underlying patterns and in particular with all patterns, in order to obtain the complete spatial information in respect of each original image point in the visual field.

In a preferred specific embodiment of the method according to the present invention, different columnar patterns are generated and/or used pairwise as a basis for the matrix-like pattern.

In particular, from the consecutive use and/or imaging with—in particular all—columnar patterns there is determined an unambiguous association of depth information in the visual field with individual utilized detector elements.

In an alternative or additional example embodiment of the present invention, for each pixel in a columnar pattern there is determined a runtime histogram of the received light intensity and therefrom the depth information determined for the respective columnar pattern.

It is especially advantageous for reconstructing the depth information if the plurality of predefined columnar patterns used for light structuring comprises or forms a complete set of columnar patterns and in particular a complete orthogonal basis.

It may also be advantageous and sufficient if alternatively thereto the plurality of predefined columnar patterns used for light structuring comprises or forms only part of a complete set of columnar patterns and in particular only part of a complete orthogonal basis, in particular at a fraction of approximately 25%. This measure decreases the cost associated with the configuration and provision of the columnar pattern, namely without appreciable limitations being involved in the reconstruction of the depth information.

According to another alternative and advantageous development of the method according to the present invention, the plurality of predefined primary columnar patterns used for light structuring exhibits uniform or variable resolution along the column direction.

The present invention further relates to a control unit for a LiDAR system, which is configured to initiate, execute, allow to run, regulate, and/or control a specific embodiment of the operating method according to the present invention in an underlying LiDAR system.

Moreover, the present invention also relates to a LiDAR system, which is configured to comprise an emitter unit for generating and emitting primary light into a visual field for the illumination thereof and a receiver unit for receiving, detecting, and evaluating secondary light from the visual field.

The proposed LiDAR system is configured to be used together with a method according to the present invention and/or to be controlled or regulated by such a method.

To this end the LiDAR system is configured advantageously so as to comprise a control unit designed according to the present invention, which in turn is configured to control the operation of the emitter unit and/or of the receiver unit and in particular to generate/emit and/or to detect and evaluate primary light to be emitted and received secondary light according to the compressed sensing method.

In an advantageous specific embodiment of the LiDAR system according to the present invention, the receiver unit comprises an optical pattern generator which is configured to collect and to restructure received secondary light according to a matrix-like pattern of the pattern generator and to output restructured secondary light using a matrix-like secondary light pattern for detection.

In another preferred specific embodiment of the present invention, the optical pattern generator is configured as a mechanically fixedly predefined light mask having a shape physically matching or corresponding to the matrix-like pattern.

The present invention also relates to a working device per se, which is configured to comprise a LiDAR system according to the present invention and is configured in particular as a vehicle.

BRIEF DESCRIPTION OF THE DRAWINGS

Specific example embodiments of the present invention are described in detail by reference to the figures.

DETAILED DESCRIPTION OF EXAMPLE EMBODIMENTS

Example embodiments of the present invention and the technical background are described below in detail by reference to FIGS. 1 through 4. Identical and equivalent as well as identically or equivalently acting elements and components are labelled by the same reference marks. The detailed description of the labelled elements and components is not reproduced in every case where they occur.

The depicted features and other properties may be isolated from one another in an arbitrary form and combined with one another arbitrarily without deviating from the core of the present invention.

For LiDAR systems 1 there exist inter alia two fundamental conceptual approaches, namely (i) on the one hand flash systems wherein the entire scene 53 of a visual field 50 is illuminated by primary light 57 followed by parallel detection, and (ii) on the other, scanner systems wherein the scene 53 is scanned, sampled, or rasterized by a single laser beam of the primary light 57.

Besides mixed forms such as the vertical flash LiDAR, thus far it is mainly sampling or scanning systems that have been able to establish themselves in the marketplace, in particular because of high technological hurdles in the development of flash systems. Regular or conventional flash systems work using two-dimensional detectors, which record a complete image of the scene 53 in the visual field 50 in a runtime-encoded manner.

An alternative detection concept comprises the compressed sensing LiDAR approach, also referred to as a photon counting LiDAR approach, based on data compression at the level of the measurement values and described in the sources [1] through [3].

Flash systems require high optical power in order to achieve long ranges, since the emitted optical power is distributed over a large space. Purely scanning systems using spot illumination, in contrast, often suffer from problems with regard to the attainable resolution, implementation of the scanning function, and eye safety.

The vertical flash LiDAR has been developed as a hybrid concept in order to circumvent the drawbacks of both variants. Here a vertical line is emitted by the LiDAR sensor, thus incorporating a flash approach in the vertical direction and a scanning approach in the horizontal direction. As is usual with flash approaches, however, a planar spatially-resolving detector is used in at least one spatial direction. On the one hand, this type of detectors is technically very demanding, especially in case of a large number of elements, i.e. pixels, and on the other hand it is cost-intensive. In addition, imaging optics of very high quality and thermal stability are needed in order to image the backscattered photons adequately on this sensor.

The approach proposed by the present invention is based on the compressed sensing principle and overcomes these drawbacks.

Figure 1:
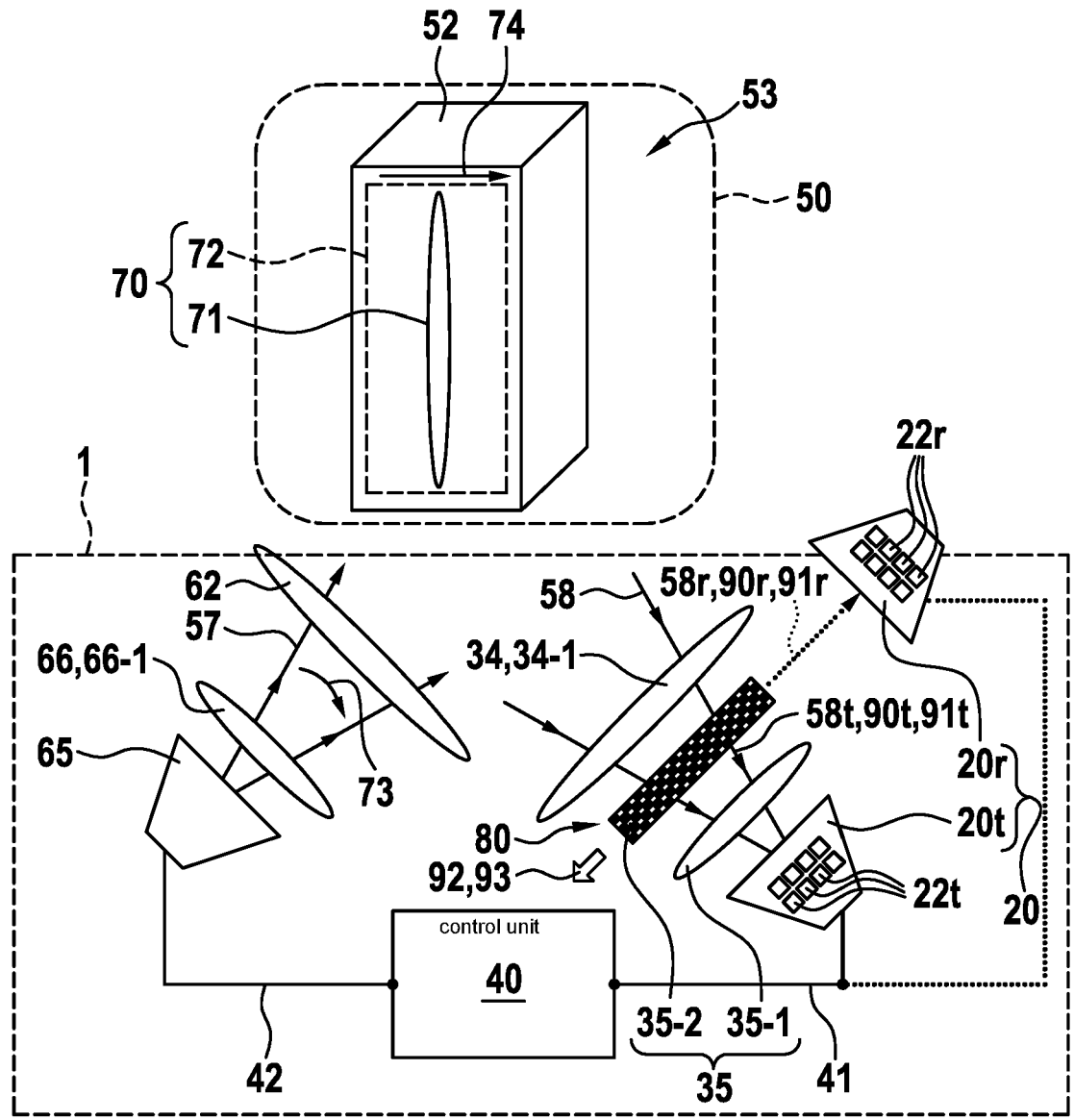
FIG. 1 shows schematically a depiction of a specific example embodiment of a LiDAR system configured according to the present invention, which may be used in conjunction with the operating method according to the present invention.

FIG. 1 shows in schematic depiction a specific embodiment of the LiDAR system 1 configured according to the present invention, which can be used in conjunction with the operating method according to the present invention.

The LiDAR system 1 comprises an emitter unit 60 which can also be conceived as emitting optics, and a receiver unit 30 which may also be conceived as receiving optics.

A control unit 40 is configured advantageously, using which the emitter unit 60 and the receiver unit 30 are connected functionally via capture and control lines 41 and 42.

The emitter unit 60 comprises a light source unit 65 for generating and emitting unstructured primary light 57, beam shaping optics 66 for beam shaping, and deflecting optics 62 for actually emitting the unstructured primary light 57 into the visual field 50 comprising the scene 53, which for example may contain an object 52.

The receiver unit 30 comprises primary optics 34, for example of the object lens type, and secondary optics 35, for example comprising receiving-side focusing optics 35-1.

A core component according to the present invention of the receiver unit 30 and in particular of the secondary optics 35 is a pattern generator 35-2 arranged between the primary optics 34 and the receiving-side focusing optics 35-1, which is configured for and comprises means for restructuring the secondary light 58 received from the visual field 50 in transmission and/or in reflection, using a matrix-like pattern 80 having columnar patterns 81 arranged in a row direction 82 of the underlying matrix 80', by transmission on the one hand and reflection/absorption on the other into a transmitted matrix-like light pattern 90t or into a reflected matrix-like light pattern 90r having respective columnar patterns 91t or 91r.

The primary optics 34 and secondary optics 35 of the receiver unit 30 also serve to image the secondary light 58r, 58t received from the visual field 50 and subsequently structured onto a detector arrangement 20, namely having part-detectors 20r, 20t for detection in reflection or in transmission, using a plurality of sensor elements 22r, 22t or detector elements.

By using the detection of the restructured secondary light 58r, 58t having the imaged secondary matrix-like light patterns 90r, 90t comprising corresponding columnar patterns 91r, 91t from the visual field 50, capturing and evaluating the visual field 50 of the LiDAR system 1, in particular according to the compressed sensing method, is possible through the interaction between the detector arrangement 20 and the control and evaluation unit 40.

According to the present invention, one or two matrix-like light patterns 90r, 90t are generated during the operation of the LiDAR system 1 on the receiving side from the unstructured primary light 58 through restructuring of received unstructured primary light 58 using a predefined, fixed, and temporally constant matrix-like pattern 80—in particular of an underlying pattern generator 35-2 of the secondary optics 35 of the receiver unit 30, from predefined and temporally constant columnar patterns 81—in reflection and/or in transmission at the pattern generator 35-2, and fed to a respective detector arrangement 20r, 20t having detector elements 22r, 22t.

Furthermore according to the present invention, restructured secondary light 58r, 58t from the visual field 50 is received from the visual field 50 during the detection and evaluation on the receiving side as a respective secondary columnar pattern 91r, 91t for detection respectively on an associated common detector element 22r, 22t of a respective detector arrangement 20r, 20t, is imaged, and detected as a whole.

The structuring of the unstructured secondary lights 58 thus takes place in the receiver unit in the secondary optics 35 before traversing focusing optics 35-1 and with the use of the receiving-side pattern generator 35-2, which may also be conceived as a pattern element and serves, for example through spatial masking or uncovering and/or reflecting, to spatially restructure the light field traversing the pattern generator 35-2 of the secondary optics 35 perpendicularly to the direction of propagation of the light, in order to configure thereby the restructured secondary light 58r, 58t and feed it to the detector arrangement 20.

To this end the pattern generator 35-2 comprises a predefined, fixed, and temporally constant configuration in the form of a matrix 80' in order to configure a matrix-like pattern 80 having columnar patterns 81, which are aligned together and proceed in rows in a row direction 82 in the underlying matrix 80'.

Accordingly, the structure of the matrix 80' serves as the basis for the construction of the respective secondary matrix-like light patterns 90r and 90t in reflection and/or in transmission having corresponding bright regions 96 or pixels and dark regions 97 or pixels.

The illumination of the visual field 50 by the unstructured primary light 57 may be performed variably, namely in particular using variably configured light fields 70.

It is possible, for example, to use a linear light field 71 comprising a sweeping-through 74 of the light field 70, 71 in the visual field 50 through an appropriate swiveling movement 73 of the or in the emitter unit 60.

Through the imaging via the deflecting optics 62 and the emission-side swiveling movement 73, in particular corresponding to the row direction 82, 92 in the pattern 80 of the pattern generator 35-2, of the imaged light patterns 90r, 90t, and/or of the underlying matrices 80', 90', the light field 70 is projected into the visual field 50 via an appropriate swiveling movement or sweeping-through movement 74.

The emission-side swiveling movement 73 thus induces a sweeping-through 74 of the light field 70 in the visual field 50.

Alternatively, the illumination of the visual field 50 by a planar light field 72 may take place without emission-side swiveling movement 73.

In this case, an appropriate receiving-side swiveling movement 93, in particular along the row direction 82, 92 of the underlying pattern of the pattern generator 35-2, of the imaged light patterns 90r, 90t and/or the underlying matrices 80', 90' may be helpful in order to realize the appropriate imaging relationship of the individual columnar patterns 91r, 91t to the common detector elements 22r, 22t.

According to the present invention, a comparatively simpler photodetector may be used in conjunction with the detector arrangement 20, 20r, 20t, in particular having a smaller number of individual detector elements 22r, 22t, which may also be referred to as pixels.

Moreover, in the present invention the respective imaging optics may be reduced to a more favorable lens system.

Furthermore, it is possible to compress the received data directly during the measurement process—hence the name 'compressed sensing'—whereby inter alia the data rate between the light sensor 20 and the processing logic 40 may be drastically reduced, for example for the communication between a rotor and a stator of the LiDAR system 1.

According to the present invention, a drawback of previous compressed sensing systems is also avoided thereby, namely the need for a light modulator and its actuation, for example in the form of a spatial light modulator which requires the shortest possible switching times.

As already described above, according to the present invention this is achieved by using for the structuring of the unstructured secondary light 58 a receiving-side pattern generator 35-2 having a predefined, fixed, and temporally constant configuration in a manner of a matrix 80' for configuring a primary pattern 80 having columnar patterns 81.

According to the present invention, as a result there is in particular no longer a need for the variability of the structuring element and for the actuation mechanisms required therefor.

Thus far, the conventionally required modulators are hardly affordable and/or suffer from severe limitations in their applicability.

For example, typically the fastest available modulators have a maximum switching frequency of 32 kHz, whereby the possible image refresh rate is severely limited. Additionally, often such components are expensive and do not conform to the requirements of the automotive sector.

A feature of the present invention thus consists of providing a compressed sensing approach which makes do without a light modulator in the conventional sense, i.e., for example without a spatial light modulator.

On the receiving side there is provided a constant pattern 80, through which the initially non-restructured secondary light 58 is restructured into a restructured primary light 58r, 58t having light patterns 90r, 90t by using the pattern 80 in reflection and/or transmission at the pattern generator 35-2.

Where applicable, a sweeping of a linear light field 71 across the scene 53 in the visual field 50, for example in the horizontal direction, may be effected by way of an emission-side scanning movement 73.

According to the present invention, the individual columnar patterns 91r, 91t of the restructured secondary light 58r, 58t having matrix-like light patterns 90r, 90t are each imaged in the receiver unit 30 on a common detector pixel 22r or 22t of the respective detector arrangement 20r or 20t.

The consecutive illumination and evaluation of the columns, using sufficiently many columnar patterns 81, make possible unambiguous association between the depth information and the individual pixels.

A compressed sensing system or CS system 1 consists essentially of three components, namely a pulsed or modulated light source 65, an element 66-2 for structuring primary light 57, and a one-dimensional or 1D-detector 20.

Digital light modulators or DLMs are used conventionally for structuring the light 57. Alternatively, this component may also be realized conventionally as an LCD display, whereby however the transmission and/or signal yield are reduced.

A feature of the present invention now consists of replacing the conventionally utilized mechanisms for dynamic pattern generation, namely in particular by a receiving-side static pattern generator 35-2 which according to the present invention is configured to provide for the structuring of the non-restructured secondary lights 58 a predefined, fixed, and temporally constant configuration in the form of a matrix 80' for configuring a pattern 80 having matrix-like light patterns 90r, 90t having respective columnar patterns 91r, or 90t as restructured secondary light 58r in reflection or as restructured secondary light 58t in transmission.

According to the present invention, as a result there is in particular no longer a need for the variability of the structuring element and for the actuation mechanisms required therefor.

A binary pattern, i.e. 'light' and 'no light', may be imprinted on the light beam through the structuring of the light field in the region of the secondary light 58.

In a typical variant of a CS system according to the present invention, the backscattered light is received as a secondary light 58 in the receiver unit 30 by a converging lens or generally by primary optics 34 and measured on a one-dimensional sensor after the restructuring in the pattern generator 35-2 of the secondary optics 35 or a one-dimensional or 1D-photodetector of the detector arrangement 20, 20r, 20t.

The detector elements or photodetectors may, for example, be cost-effective avalanche photodiodes (APD), which simultaneously allow for high sensitivity and a fast measurement time. The utilized photodiode as a detector element 22r, 22t of the detector arrangement 20, 20r, 20t records a complete histogram of the received photons.

In order to be able to reconstruct therefrom the scene 53 in the visual field 50, the scene 53 has to be detected by way of a complete set of structuring items in the form of columnar patterns 81 of the pattern 80.

Complete here means comprising a complete orthogonal basis, for example based on Hadamard matrices.

An advantage of the method having receiving-side light structuring includes the fact that the whole power of the light source 65 may be utilized to illuminate the scene 53 in the visual field 50. In the case of emission-side light structuring, usually approximately 50% of the optical power is dissipated and lost due to the masking of individual pixels.

As mentioned above, in the compressed sensing system 1 according to the present invention having receiving-side light filtering or restructuring of the secondary light 58, the requirements regarding the beam quality of the underlying light source 65 are reduced since the beam of the primary light 57 may be significantly larger, in order to e.g. illuminate several receiving-side columns simultaneously. The latter allows the use of simpler, more cost-effective object lenses in the primary optics 34 of the receiver unit 30 and higher maximum laser power, bearing in mind eye safety. The latter is associated with an increased range.

One aspect of the present invention consists in providing and using an optical mask as pattern generator 35-2 in the secondary optics 35 of the receiver unit 30, which may be introduced in the image plane of imaging optics 34.

The mask 35-2 is so configured that it consists of equally large elements, which may be understood as transmitting or blocking/reflecting pixels 86, 87 and thus are either transparent or absorbing/reflecting.

Figure 2:
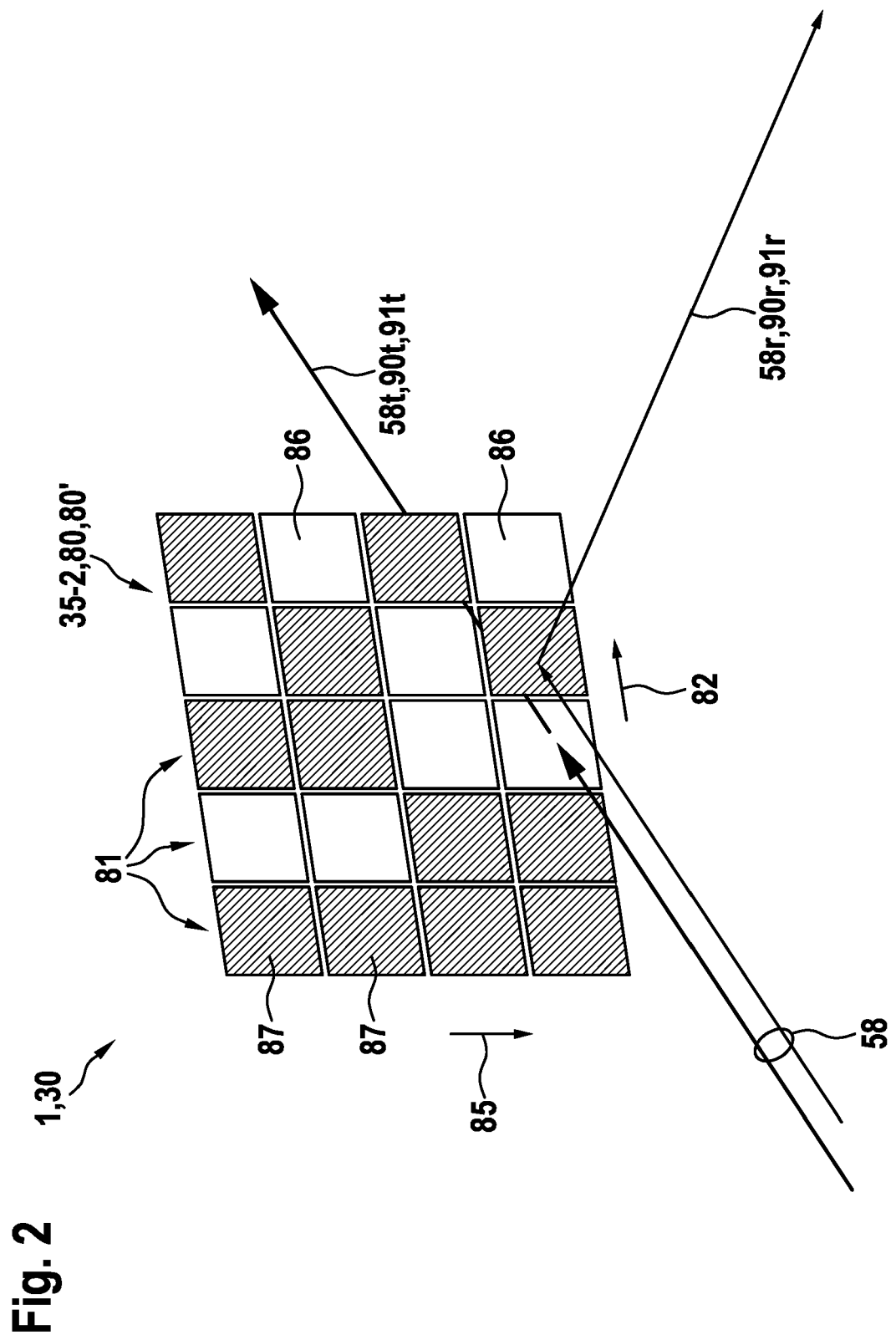
FIG. 2 elucidates schematically aspects of a specific embodiment of the LiDAR system according to the present invention, focusing on the shape and mode of action of the pattern generator in the receiver unit.
Figure 4:
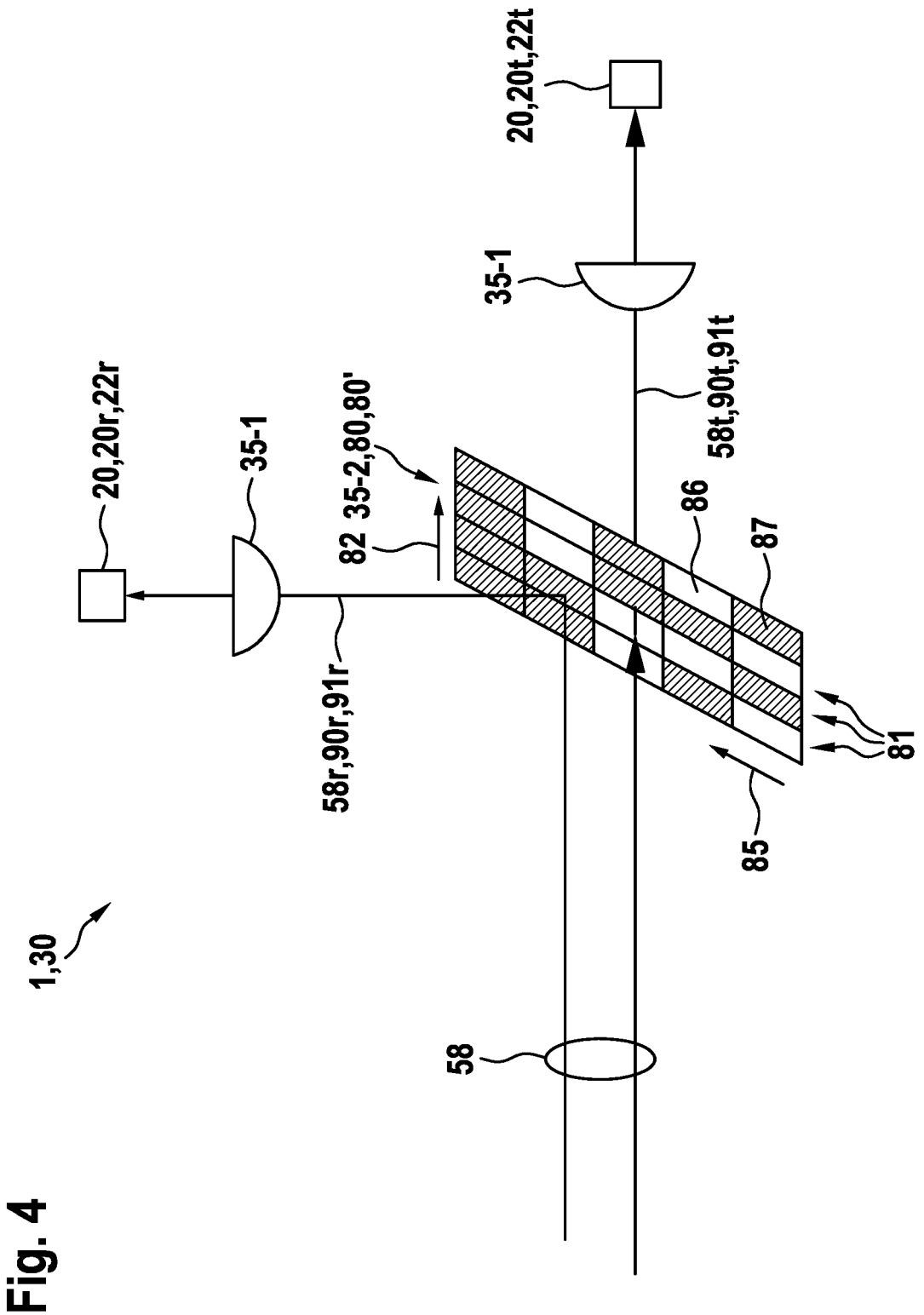
FIG. 4 schematically illustrates details of a double detector layout for simultaneous evaluation of complementary light patterns in reflection and transmission.

FIGS. 2 and 4 show by way of example and schematically aspects of a specific embodiment of the LiDAR system 1 according to the present invention which focus on the shape and the mode of action of the pattern generator 35-2 in the receiver unit 30.

The overall arrangement of the elements 86, 87 of the pattern 80 corresponds to the columnar patterns 81 which are necessary for a reconstruction in accordance with the compressed sensing approach. Ideally but not necessarily, the columnar patterns 81 in the underlying pattern 80 of the pattern generator 35-2 are arranged in their natural sequence, for example by increasing frequency.

In order to reconstruct the image in terms of the compressed sensing approach, it is necessary that for every columnar pattern 81 of the underlying pattern 80, signals relating to the corresponding columnar patterns 91r, 91t of the secondary light pattern 90r, 90t are measured in transmission as patterns and also in reflection the as the complementary pattern or counter-pattern.

Figure 3:
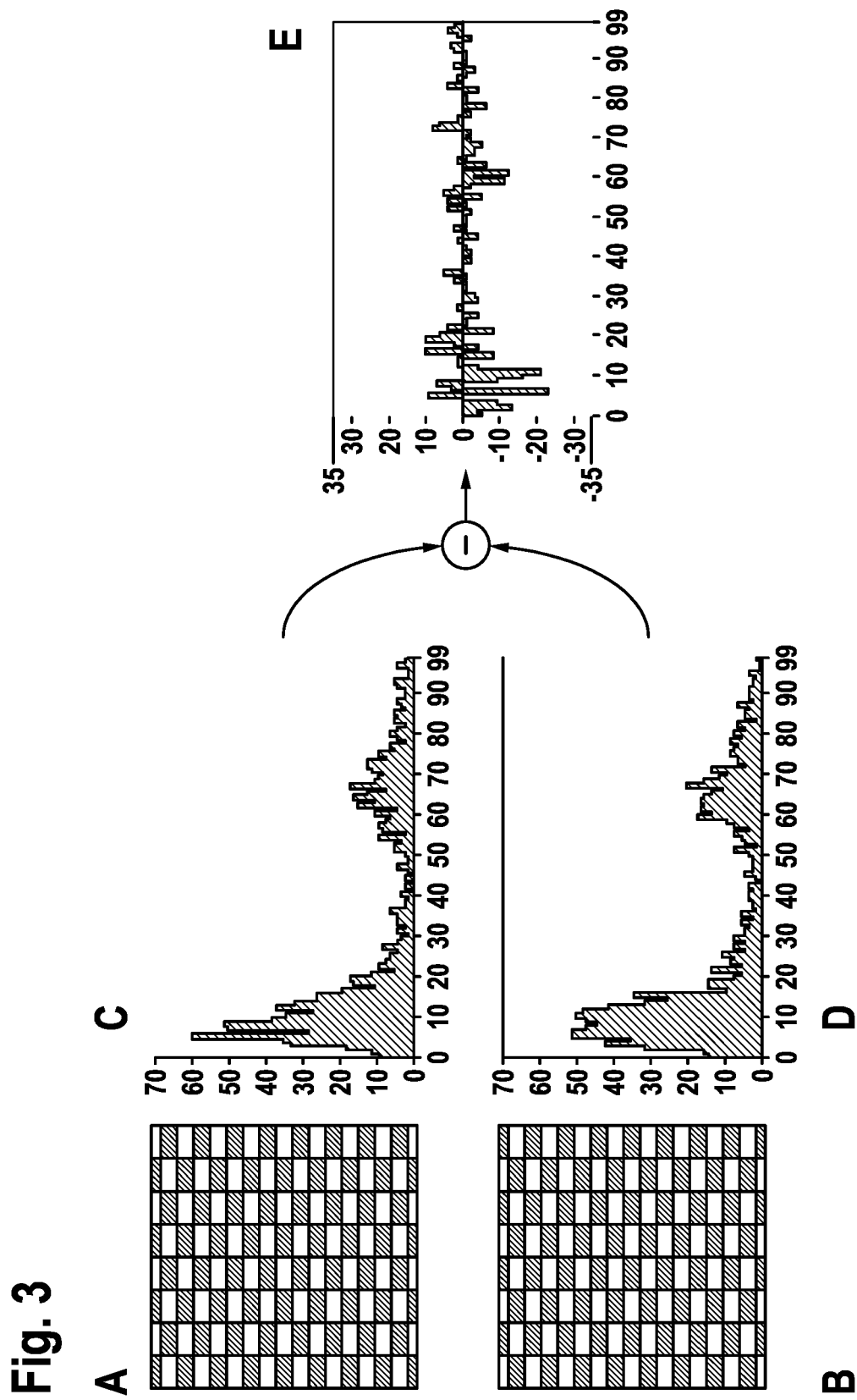
FIG. 3 visualizes aspects of the analysis of the received secondary light under simultaneous evaluation of complementary light patterns in reflection and transmission.

The coefficient for the reconstruction may then be determined accordingly from the difference between the two signals, as depicted in FIG. 3.

In an advantageous embodiment of the present invention, this may be utilized through the mirror mask as pattern generator 35-2 by having the separated beams 58r, 58t imaged simultaneously on two detector units 20r, 20t, as is depicted in FIG. 4.

FIG. 4 shows schematically details of a double detector design for simultaneous evaluation of complementary light patterns 90r and 90t of the restructured secondary light 58r and 58t in reflection and/or in transmission.

The two corresponding signals may therefore be measured simultaneously and the number of the necessary columnar patterns 81 in the underlying pattern 80 may be further reduced.

SOURCES

[1] Howland et al., "Photon-counting compressive sensing laser radar for 3D imaging", in: Applied Optics 50 (31), November 2011.
[2] Howland et al., "Photon counting compressive depth mapping", in: Optics Express 21 (20), September 2013.
[3] Edgar et al., "Real-time computational photon-counting LiDAR", in: Optical Engineering 57 (3), March 2018.

The invention claimed is:

1. An operating method for a LiDAR system of compressed sensing type, the method comprising the following steps:
   (i) on an emission side, using an emitter unit, emitting primary light in an unstructured manner into a visual field for illumination of the visual field; and
   (ii) on a receiving side, using a receiver unit including a predefined, fixed, and temporally constant matrix-like pattern:
      receiving light from the visual field as secondary light;
      converting the received light by light structuring, using the matrix-like pattern, into restructured secondary light having at least one matrix-like light pattern including columnar patterns; and
      imaging for detection the restructured secondary light column by column using the columnar patterns on an associated common detector element of a detector arrangement and detecting the restructured secondary light as a whole, wherein one of:
         (a) the emitting step includes the step of swiveling the emitter unit in a controlled manner, or
         (b) the receiving step includes the step of swiveling the receiver unit in a controlled manner.

2. The operating method according to claim 1, wherein the matrix-like pattern is provided using a pattern generator using a predefined, fixed, and temporally constant light mask, and/or
the secondary light is restructured to the restructured secondary light in transmission and/or in reflection to the pattern generator, and/or
transmitted restructured secondary light having a first, transmitted matrix-like light pattern having first columnar patterns is detected by a first detector arrangement having first detector elements, and/or
reflected restructured secondary light having a second, reflected matrix-like light pattern having second columnar patterns is detected by a second detector arrangement having second detector elements, and/or
reflected and transmitted light patterns are evaluated after detection as light patterns complementary to one another separately and/or in combination with one another.

3. The operating method according to claim 1, wherein the illumination of the visual field using the primary light:
   (i) takes place through linear illumination using a linear light field of the primary light by sampling while swiveling the light field over the visual field, by swiveling a light source and/or deflecting optics; and/or (ii) takes place through planar illumination using a planar light field;
   each time continuously and/or according to a flash principle.

4. The operating method according to claim 1, wherein, during the illumination of the visual field, for the purpose of an association between columnar patterns of the matrix-like pattern and corresponding imaged columnar patterns on detector elements of a respective detector arrangement, on the receiving side, an underlying pattern generator and/or a respective detector arrangement rand/or underlying primary optics are swiveled in a coordinated and/or controlled and/or regulated manner.

5. The operating method according to claim 1, wherein:
   pair-wise different columnar patterns are provided and/or generated and/or used as a basis for the matrix-like pattern and/or for the matrix-like light pattern, and
   from consecutive use and/or imaging with all columnar patterns, unambiguous association of depth information in the visual field to individual detector elements is determined.

6. The operating method according to claim 1, wherein a runtime histogram of received light intensity is ascertained for every pixel in each columnar pattern and depth information associated with the columnar pattern is determined therefrom.

7. The operating method according to claim 1, wherein the columnar patterns used for light structuring includes or forms a complete set of columnar patterns and a complete orthogonal basis or a part of an orthogonal basis at a proportion of approximately 25%.

8. The operating method according to claim 1, wherein the columnar patterns used for the light structuring exhibits uniform or variable resolution along a column direction.

9. The operating method according to claim 1, wherein the emitter unit is swiveled.

10. The operating method according to claim 1, wherein the receiver unit is swiveled.

11. A control unit for a LiDAR system, the control unit configured to control the LiDAR system to:
   (i) on an emission side, using an emitter unit, emit primary light in an unstructured manner into a visual field for illumination of the visual field; and
   (ii) on a receiving side, using a receiver unit including a predefined, fixed, and temporally constant matrix-like pattern:
      receive light from the visual field as secondary light;
      convert the received light by light structuring, using the matrix-like pattern, into restructured secondary light having at least one matrix-like light pattern including columnar patterns; and
      image for detection the restructured secondary light column by column using the columnar patterns on an associated common detector element of a detector arrangement and detecting the restructured secondary light as a whole, wherein one of:
(a) emitting includes swiveling the emitter unit in a controlled manner, or
(b) receiving includes swiveling the receiver unit in a controlled manner.

12. A LiDAR system, comprising:
an emitter unit configured to generate and emit primary light into a visual field for illumination of the visual field; and
a receiver unit configured to for receive, detect, and evaluate secondary light from the visual field;
wherein the LiDAR system is configured to:
(i) on an emission side, emit, using the emitter unit, the primary light in an unstructured manner into the visual field for illumination of the visual field; and
(ii) on a receiving side, using the receiver unit including a predefined, fixed, and temporally constant matrix like pattern:
receive light from the visual field as the secondary light;
convert the received light by light structuring, using the matrix-like pattern, into restructured secondary light having at least one matrix-like light pattern including columnar patterns; and
image for detection the restructured secondary light column by column using the columnar patterns on an associated common detector element of a detector arrangement and detecting the restructured secondary light as a whole, wherein one of:
(a) emitting includes swiveling the emitter unit in a controlled manner, or
(b) receiving includes swiveling the receiver unit in a controlled manner.

13. The LiDAR system according to claim 12, wherein the receiver unit includes an optical pattern generator which is configured to accept and to restructure the received secondary light according to the matrix-like pattern of the pattern generator and to output the restructured secondary light having the matrix-like secondary light pattern for detection.

14. The LiDAR system according to claim 12, wherein the optical pattern generator is configured as a mechanically fixedly predefined light mask having a shape physically matching or corresponding to the matrix-like pattern.

15. A vehicle, comprising:
a LiDAR system, including:
an emitter unit configured to generate and emit primary light into a visual field for illumination of the visual field; and
a receiver unit configured to for receive, detect, and evaluate secondary light from the visual field;
wherein the LiDAR system is configured to:
(i) on an emission side, emit, using the emitter unit, the primary light in an unstructured manner into the visual field for illumination of the visual field; and
(ii) on a receiving side, using the receiver unit including a predefined, fixed, and temporally constant matrix like pattern:
receive light from the visual field as the secondary light;
convert the received light by light structuring, using the matrix-like pattern, into restructured secondary light having at least one matrix-like light pattern including columnar patterns; and
image for detection the restructured secondary light column by column using the columnar patterns on an associated common detector element of a detector arrangement and detecting the restructured secondary light as a whole,
wherein one of:
(a) emitting includes swiveling the emitter unit in a controlled manner, or
(b) receiving includes swiveling the receiver unit in a controlled manner.

* * * * *